Sept. 10, 1929.  M. A. ERICKSON  1,727,538
VEHICLE DUMPING PLATFORM
Filed June 1, 1926
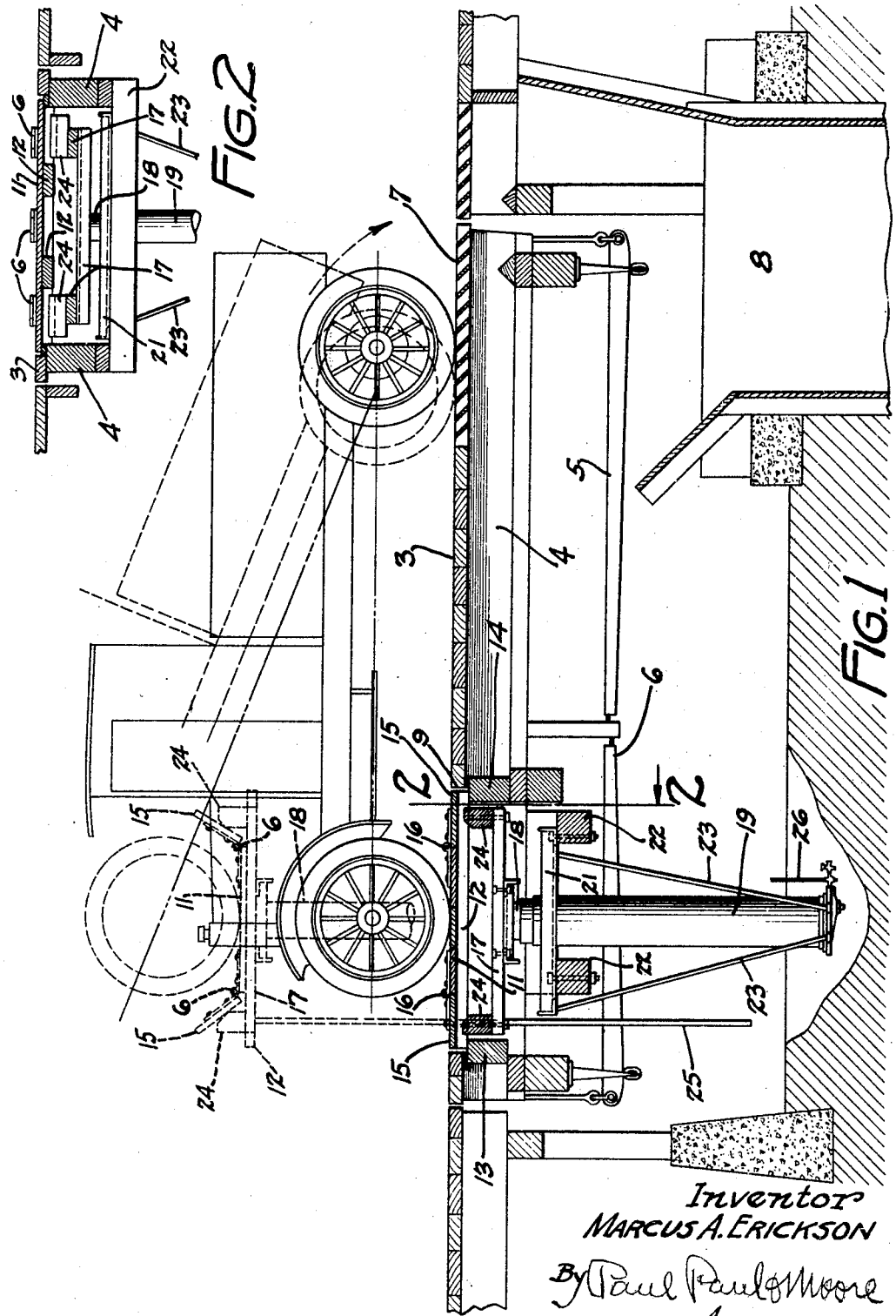
Inventor
MARCUS A. ERICKSON
By Paul, Paul & Moore
Attorneys Patented Sept. 10, 1929.

1,727,538

UNITED STATES PATENT OFFICE.

MARCUS A. ERICKSON, OF MINNEAPOLIS, MINNESOTA, ASSIGNOR TO STRONG-SCOTT MANUFACTURING COMPANY, OF MINNEAPOLIS, MINNESOTA, A CORPORATION OF MINNESOTA.

VEHICLE DUMPING PLATFORM.

Application filed June 1, 1926. Serial No. 112,920.

This invention relates to improvements in vehicle-dumping platforms particularly adapted for use to lift the forward end of vehicles to discharge the contents therefrom, and more particularly relates to such a device adapted for use in connection with a weighing platform, comprising a supplemental lifting platform vertically movable with respect to the weighing platform, to elevate the forward end of the vehicle, and is an improvement upon the structure shown in my Patent No. 1,518,780, issued December 9, 1924.

An object of the present invention is to provide a vehicle-dumping device comprising a supplemental lifting platform having hinged sections or wings provided thereon adapted to be tilted to oblique positions, when the platform is elevated, for the purpose of providing wheel stops for the forward wheels of the vehicle when in elevated position.

A further object of the invention is to provide such a device comprising a supplemental lifting platform normally supported upon the weighing platform, and having a lifting means positioned beneath the weighing platform vertically movable to engage the lifting platform to elevate the forward end of the vehicle, and the lifting platform having hinged wings adapted to be engaged by means on said lifting device and moved to inclined positions above the lifting platform, before the latter is moved out of contact with the weighing platform, thereby providing wheel stops functioning to prevent the forward wheels of the vehicle from rolling off the platform when in an elevated position.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the accompanying drawings forming part of this specification:

Figure 1 is a vertical sectional view of the improved vehicle-dumping platform showing the supplemental lifting platform in raised position; and Figure 2 is a transverse sectional view on the line 2—2 of Figure 1.

In the selected embodiment of the invention here shown for purposes of disclosure there is illustrated a platform scale of the type ordinarily employed in connection with grain elevators for weighing and unloading grain from a truck or other vehicle. This platform scale comprises the usual weighing platform 3, mounted upon the usual side rails 4, supported upon the usual scale beams 5 and 6, as shown in Figure 1. The rear end portion of the weighing platform 3 preferably has a grate 7 through which the grain or contents of the vehicle may be discharged into a receiving hopper 8 positioned therebeneath.

An opening 9 is provided in the forward portion of the weighing platform 3, which normally is closed by a supplemental lifting platform 11, comprising a pair of bars 12 normally having their ends seated upon cross beams 13 and 14 of the weighing platform. The lifting platform is provided at its forward and rear portions with wings 15 hinged to the main portion of the lifting platform by means of hinges 16, as clearly shown in Figure 1. These wings are adapted to be tilted to oblique positions, when the lifting platform is lifting a load, as shown in dotted lines in Figure 1, thereby providing wheel stops functioning to prevent the front wheels of the vehicle from rolling off the platform when in dumping position.

The means provided for elevating the lifting platform 11, preferably consists of a lifting frame 17 terminally secured to a plunger 18 reciprocally mounted in a cylinder 19, suspended from the weighing platform, 3, as shown. The cylinder 19, as here shown, is rigidly held by supporting frame 21 secured to cross timbers or beams 22, secured to the usual side rails 4 of the weighing platform, as particularly shown in Figure 2. Diagonal braces 23 connect the lower end of the cylinder with the frame 21 to retain it in upright position.

The means provided for vertically moving or tilting the wheel stops or wings 15 preferably consists of a plurality of blocks 24 mounted upon and secured to the lifting frame 17, as shown in the drawings. These blocks are adapted to engage the wings 15, when the plunger 18 is moved upwardly, and tilt the wings 15 to an inclined position, as shown in dotted lines in Figure 1, before the lifting frame 17 engages the lifting platform 11. Thus the wings 15 will be raised to their operative positions before the lifting platform commences to elevate the forward end of the vehicle, with the result that the forward wheels of the vehicle will be prevented from rolling off the platform during the operation of dumping or discharging the contents from the vehicle.

A horse guard or frame 25 is shown secured to the lifting frame 17 and depends therefrom into the opening provided at the forward end of the weighing platform, as shown in full and dotted lines in Figure 1. When the lifting platform is in the dotted line position shown, the frame 25 will assume the position shown in dotted lines, thereby preventing the horses from accidentally stepping into the opening normally closed by the lifting platform when in lifting position.

The cylinder 19 has a pipe 26 connecting it with a suitable source of air pressure whereby the plunger 18 may be reciprocally operated therein. Suitable means (not shown) are provided for controlling the flow of fluid pressure to the cylinder to control the lifting operation of the plunger.

I claim as my invention:

1. A weighing scale platform, comprising in combination, a vertically movable lifting platform normally supported thereon, a fluid pressure cylinder rigidly mounted beneath said lifting platform and having a piston operable therein to raise the platform to lift one end of a vehicle, and hinged members on said lifting platform adapted to swing upwardly and inwardly above the horizontal plane thereof, to provide wheel stops for the vehicle, when the platform is raised to a load-dumping position.

2. A weighing scale platform, comprising in combination, a vertically movable lifting platform normally supported thereon, a fluid pressure cylinder rigidly mounted beneath said lifting platform and having a piston operable therein to raise the platform to lift one end of a vehicle, and members pivotally connected with said lifting platform and adapted to be moved to oblique positions to provide wheel stops for the vehicle to resist forward and rearward movement thereof within certain limits, when the platform is raised to a load-dumping position.

3. A weighing platform, comprising in combination, a vertically movable lifting platform normally supported thereon, a fluid pressure cylinder rigidly mounted beneath said lifting platform and having a piston operable therein to raise the platform to lift one end of a vehicle, said lifting platform having its forward and rearward portions hinged thereto, transversely thereof, and means carried by said piston and normally out of engagement with said lifting platform and adapted, upon initial movement of said piston, to engage said hinged portions and tilt them to inclined positions to provide wheel stops for a vehicle, and said means thereafter engaging said lifting platform and bodily raising it to a load-dumping position.

4. A weighing platform, comprising in combination, a lifting platform normally supported thereon in horizontal alignment therewith, wings hinged to said lifting platform transversely thereof, and extending the full width of the platform, a fluid pressure cylinder rigidly suspended beneath said lifting platform and having a piston operable therein, a frame terminally mounted upon said piston and normally out of engagement with said lifting platform, and means on said frame adapted, upon initial movement of said piston, to engage said wings and move them upwardly to inclined positions to provide wheel stops for a vehicle, and said frame subsequently engaging said lifting platform and bodily moving it to a load-dumping position and returning the same to its normal position, independently of said weighing platform.

5. A weighing platform, comprising in combination, a lifting platform normally supported thereon, hinged wings on said lifting platform extending the full width thereof, a cylinder rigidly mounted beneath said lifting platform, a fluid-operated piston therein, a frame terminally mounted upon said piston and normally out of engagement with said lifting frame, and blocks provided on said frame beneath said wings and projecting upwardly therefrom whereby, when said piston is initially moved, said blocks will engage said wings and swing them upwardly and inwardly to wheel-stopping positions, after which said frame will engage said lifting platform and bodily move it to a load-dumping position, said wings being held in wheel-stopping positions while said lifting platform is out of engagement with said weighing platform.

6. In a vehicle-dumping device, a vertically movable elevating platform and a normal support therefor, in combination with a cylinder anchored below said platform, a piston working in said cylinder, a platform-lifting device carried by said piston, normally out of connection with said platform but movable to pick up and elevate the same bodily and to thereby move the vehicle into a load-dumping position, wheel stops pivotally connected with opposite sides of said elevating platform, and projections on said lifting device engageable therewith to raise said stops above said platform, when the latter is raised.

7. The combination with a vehicle-dumping platform comprising a main portion and a vertically movable section cooperable therewith to support a vehicle, of hinged members on said movable section adapted to swing upwardly and inwardly to provide wheel stops for the vehicle, when said section is elevated to a load-dumping position.

In witness whereof, I have hereunto set my hand this 28th day of May 1926.

MARCUS A. ERICKSON.